United States Patent
Nobuta et al.

(10) Patent No.: US 8,164,884 B2
(45) Date of Patent: Apr. 24, 2012

(54) SOLID ELECTROLYTIC CAPACITOR WITH IMPROVED MOISTURE RESISTANCE PROPERTIES AND METHOD OF MANUFACTURING THE SAME

(75) Inventors: Tomoki Nobuta, Sendai (JP); Naoki Takahashi, Sendai (JP); Ryuta Kobayakawa, Sendai (JP); Satoshi Suzuki, Sendai (JP); Toshihiko Nishiyama, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 653 days.

(21) Appl. No.: 12/259,372

(22) Filed: Oct. 28, 2008

(65) Prior Publication Data

US 2009/0109603 A1 Apr. 30, 2009

(30) Foreign Application Priority Data

Oct. 30, 2007 (JP) ................................. 2007-281080

(51) Int. Cl.
*H01G 9/02* (2006.01)
*H01G 9/04* (2006.01)
(52) U.S. Cl. ......................... 361/525; 361/532; 29/25.03
(58) Field of Classification Search ................. 361/523, 361/525–527, 528, 532; 29/25.03
See application file for complete search history.

(56) References Cited

U.S. PATENT DOCUMENTS

| 6,224,639 B1 | 5/2001 | Hamada et al. |
| 6,515,848 B1* | 2/2003 | Yoshida et al. ............... 361/525 |
| 6,580,601 B2* | 6/2003 | Hamada et al. ............... 361/523 |
| 6,661,644 B2* | 12/2003 | Shimada et al. ............... 361/508 |
| 2003/0133256 A1* | 7/2003 | Yoshida et al. ............... 361/523 |

FOREIGN PATENT DOCUMENTS

| JP | 2000-021686 A | 1/2000 |
| JP | 2005-252213 A | 9/2005 |
| JP | 2006-185973 A | 7/2006 |
| JP | 2006-310365 A | 11/2006 |
| JP | 2006-351609 A | 12/2006 |

OTHER PUBLICATIONS

Korean Office Action dated Jan. 6, 2011 (and English translation thereof) in counterpart Korean Application No. 10-2008-0104667.
Japanese Office Action dated Jun. 30, 2011 (and English translation thereof) in counterpart Japanese Application No. 2007-281080.

* cited by examiner

*Primary Examiner* — Eric Thomas
(74) *Attorney, Agent, or Firm* — Holtz, Holtz, Goodman & Chick, PC

(57) ABSTRACT

In a solid electrolytic capacitor including a porous valve-acting metal, an anode conductor has a large number of pores having openings on the surface thereof according to the porosity of the valve-acting metal. A solid electrolyte layer is formed on the surface of the anode conductor so as to be filled in at least a portion of each of the pores and to close the openings thereof. Further, a cathode conductor is formed on the solid electrolyte layer. Preferably, the solid electrolyte layer has a two-layer structure with two layers having different particle sizes.

15 Claims, 1 Drawing Sheet

US 8,164,884 B2

SOLID ELECTROLYTIC CAPACITOR WITH IMPROVED MOISTURE RESISTANCE PROPERTIES AND METHOD OF MANUFACTURING THE SAME

This application is based upon and claims the benefit of priority from Japanese patent application No. 2007-281080, filed on Oct. 30, 2007, the disclosure of which is incorporated herein in its entirety by reference.

TECHNICAL FIELD

This invention relates to a solid electrolytic capacitor and, more specifically, relates to a solid electrolytic capacitor using a valve-acting metal and a method of manufacturing such a solid electrolytic capacitor.

BACKGROUND ART

There has been developed a solid electrolytic capacitor obtained by forming a dielectric oxide film on a porous body of a valve-acting metal such as tantalum or aluminum by anodic oxidation and then forming on the oxide film a conductive polymer layer as a solid electrolyte. Roughly classified, there are chemical oxidation polymerization and electrolytic oxidation polymerization as methods for forming the conductive polymer layer of the solid electrolytic capacitor. As a monomer forming a conductive polymer material, there are known pyrrole, thiophene, 3,4-ethylene dioxythiophene, aniline, and so on.

Such a solid electrolytic capacitor has a lower equivalent series resistance (hereinafter referred to as "ESR") as compared with a conventional capacitor using manganese dioxide as a solid electrolyte and thus has started to be used in various applications. In recent years, following the trend toward higher frequencies and larger currents of integrated circuits, there have been demanded solid electrolytic capacitors with low ESR, large capacitance, and small loss.

Techniques relating to such solid electrolytic capacitors are disclosed in Patent Document 1 (Japanese Unexamined Patent Application Publication (JP-A) No. 2000-232036) and Patent Document 2 (Japanese Unexamined Patent Application Publication (JP-A) No. 2003-229330).

Patent Document 1 achieves a low ESR by mixing conductive particles having plasticity or flexibility into a conductive polymer layer to provide irregularities at the interface of the conductive polymer layer with a cathode conductor layer, thereby increasing the contact area between the conductive polymer layer and the cathode conductor layer.

Patent Document 2 proposes a solid electrolytic capacitor manufacturing method characterized by comprising a step of forming a first conductive polymer film serving as part of a conductive polymer layer in a first solution and a step of forming a second conductive polymer film serving as another part of the conductive polymer layer in a second solution having a pH lower than that of the first solution, wherein the first conductive polymer film and the second conductive polymer film are both formed by electrolytic oxidation polymerization, thereby achieving a low ESR and an increase in capacitance.

SUMMARY OF THE INVENTION

As described above, the solid electrolytic capacitors using the conductive polymer layer as the solid electrolyte have been subjected to much study. However, neither of Patent Documents 1 and 2 shows a specific method for maintaining the excellent capacitor characteristics even in a high temperature atmosphere or a high humidity atmosphere and thus it is considered that the reduction in ESR and the reliability have not yet been sufficiently achieved simultaneously in the solid electrolytic capacitor.

For example, the method of providing the irregularities at the interface of the conductive polymer layer as in Patent Document 1 can contribute to the low ESR, but cannot be said to be sufficient with respect to the reliability in the high temperature atmosphere or the high humidity atmosphere.

Further, according to the method of depositing a polymer into pores by chemical oxidation polymerization or electrolytic oxidation polymerization while adjusting the pH of the solutions to control the particle size as in Patent Document 2, even if the polymerization is repeated several times so that the polymer can be filled in the pores, a layer of the polymer has an irregular surface where the particles cohere to expose their particle boundaries and therefore, it is difficult to maintain the excellent capacitor characteristics even in the high temperature atmosphere or the high humidity atmosphere.

It is therefore an exemplary object of this invention to provide a solid electrolytic capacitor with a low ESR and excellent reliability, wherein a solid electrolyte is not stripped from the interface between a dielectric layer and the solid electrolyte even by heat stress or moisture absorption.

It is another exemplary object of this invention to provide a method of manufacturing the above solid electrolytic capacitor.

Other objects of the present invention will become clear as the description proceeds.

According to an exemplary aspect of the present invention, there is provided a solid electrolytic capacitor which comprises an anode conductor including a porous valve-acting metal and having a large number of pores with openings on a surface thereof, a solid electrolyte layer formed on the surface of the anode conductor so as to be filled in at least a portion of each of the pores and to close the openings, and a cathode conductor formed on the solid electrolyte layer.

According to another exemplary aspect of the present invention, there is provided a method of manufacturing a solid electrolytic capacitor, which comprises a step of preparing an anode conductor including a porous valve-acting metal and having a large number of pores with openings on a surface thereof and an electrolyte layer forming step of forming a solid electrolyte layer on the surface of the anode conductor so as to be filled in at least a portion of each of the pores and to close the openings.

DESCRIPTION OF THE EXEMPLARY EMBODIMENTS

Figure 1:
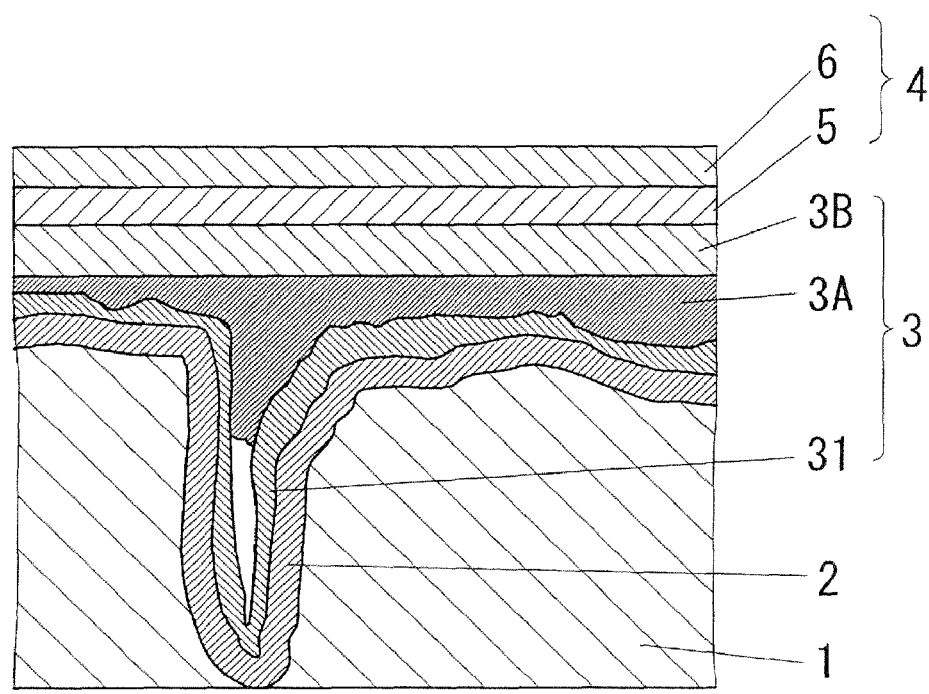
FIG. 1 is an exemplary sectional view illustrating a main portion of a solid electrolytic capacitor according to an exemplary embodiment of this invention.

Referring to the drawings, a description will be given of a structure and a manufacturing method of a solid electrolytic capacitor according to exemplary embodiments of this invention.

In FIG. 1, a capacitor element serving as the main part of the solid electrolytic capacitor according to the exemplary embodiment of this invention has a structure in which a dielectric layer 2, a solid electrolyte layer 3, and a cathode conductor 4 are formed in this order on an anode conductor 1. The solid electrolyte layer 3 comprises a first polymer layer 3A, a second polymer layer 3B, and an inner polymer layer 31.

The anode conductor 1 is formed of a plate, a foil, or a line of a valve-acting metal, a sintered body of valve-acting metal particles, a porous metal having been subjected to a surface-enlarging treatment by etching, or the like. As the valve-acting metal, there are cited tantalum, aluminum, titanium, niobium, zirconium, alloys of them, and so on. Among them, the valve-acting metal is preferably at least one kind selected from tantalum, aluminum, and niobium.

The dielectric layer 2 is a film that is obtained by electrolytically oxidizing the surface of a conductor portion serving as the main part of the anode conductor 1 and that is formed also in pores of the sintered body, the porous metal, or the like. Therefore, herein, a description will be given assuming that the dielectric layer 2 is included in the anode conductor 1. That is, the anode conductor 1 including the dielectric layer 2 contains a porous valve-acting metal (hereinafter may also be referred to as a "porous body") and has a large number of pores each having an opening on the surface thereof. The thickness of the oxide film can be suitably adjusted by a voltage of the electrolytic oxidation.

The solid electrolyte layer 3 includes at least a conductive polymer layer. The conductive polymer layer is made of a polymer containing, for example, at least one kind of monomer selected from pyrrole, thiophene, 3,4-ethylene dioxythiophene, aniline, and derivatives thereof. Among them, the polymer preferably contains pyrrole, thiophene, 3,4-ethylene dioxythiophene, or its derivative. The polymer is formed on the dielectric layer 2 by chemical oxidation polymerization or electrolytic oxidation polymerization of the above monomer and an oxidizing agent, as a dopant, containing, for example, a sulfonic acid compound, a metal salt, or a sulfate.

The solid electrolyte layer 3 may contain an oxide derivative such as manganese dioxide or ruthenium oxide, or an organic semiconductor such as TCNQ (7,7,8,8-tetracyanoquinodimethane complex salt).

The first and second polymer layers 3A and 3B are formed by using first and second polymer solutions, respectively. Each of the first and second polymer solutions contains a conductive polymer and is mainly composed of a polymer containing at least one kind of monomer selected from pyrrole, thiophene, 3,4-ethylene dioxythiophene, aniline, and derivatives thereof, a dopant, and water or a water/organic solvent mixed solution. It is preferable that the polymer contain pyrrole, 3,4-ethylene dioxythiophene, or its derivative and it is particularly preferable that the polymer have the same type of polymer backbone as that of the inner polymer layer 31. The dopant is preferably a sulfonic acid compound such as naphthalene sulfonic acid, benzene sulfonic acid, styrene sulfonic acid, or its derivative. The molecular weight of the dopant can be suitably selected from that of a monomer to that of a polymer.

The solvent may be either only water or a mixed solvent containing an organic solvent soluble to water. The organic solvent is preferably a polar solvent such as dimethylformamide, dimethylacetamide, dimethylsulfoxide, ethylene glycol, glycerin, or sorbitol. Mixing of the organic solvent facilitates, not a little, dissolution of the polymer and thus serves to improve the film formability and, therefore, it is preferable to add a suitable amount of the organic solvent.

The particle size of the first polymer solution is set smaller than the diameter of each of the pores on the surface of the porous body and is preferably set to 20% or less of the pore diameter when compared by the most frequent values.

The particle size of the second polymer solution is preferably greater than a particle size distribution range of the first polymer solution. Specifically, the particle size distribution of the first polymer solution is preferably in a range of $D_{90} \leqq 100$ nm, while the particle size of the conductive polymer of the second polymer solution is preferably $D_{10} \geqq 1$ μm. $D_{90}$ represents a particle size when the accumulated amount is 90% in a cumulative particle size curve and $D_{10}$ represents a particle size when the accumulated amount is 10% in a cumulative particle size curve.

The control of particle size can be achieved by properly selecting the type of dopant and a reaction solvent to control a polymerization reaction. Generally, the particle size distribution can be measured by a centrifugal settling method, a light transmission method, a laser diffraction method, a dynamic light scattering method, an ultrasonic method, or the like.

Next, the description will be given of a method of forming the first and second polymer layers 3A and 3B.

The first and second polymer layers 3A and 3B are formed by impregnating or coating the first and second polymer solutions and then drying them, respectively. In the case of the impregnation, it is preferably carried out by a so-called decompression or pressurization method. In the case of the coating, the coated polymer solution is preferably left standing for several minutes after the coating for sufficiently filling the coated polymer solution into the pores. The drying temperature is not particularly limited as long as it is within a temperature range that can remove the solvent, but in terms of preventing element degradation due to heat, it is preferably less than 200° C.

In practice, the first polymer solution is adhered to the inner polymer layer 31 by impregnation or coating and then is dried, thereby forming the first polymer layer 3A in the form of a film. Thereafter, the second polymer solution is adhered to the first polymer layer 3A by impregnation or coating and then is dried, thereby forming the second polymer layer 3B in the form of a film. The thickness of each of the first and second polymer layers 3A and 3B is not particularly limited, but if it is 1 μm or more, it is possible to ensure excellent reliability.

The cathode conductor 4 is not particularly limited as long as it is a conductor, and may have a two-layer structure comprising a carbon layer 5 such as a graphite layer and a silver conductive resin layer 6.

According to the solid electrolytic capacitor described above, since each polymer layer is formed by using the polymer solution containing the polymer, the dense and excellent film-like polymer layer can be easily formed. Further, since it is possible to optionally select and mix a suitable additive or the like for improving the formability of the polymer layer, the formation of the polymer layer is easy.

By forming the first polymer layer 3A in the foregoing manner using the conductive polymer solution, the following effects can be achieved.

(1) The ESR can be lowered by increasing the contact area with the conductive inner polymer layer 31 in the pores.

(2) The degradation of the capacitor performance is prevented by reducing spaces in the pores to suppress permeation of water and oxygen in the atmosphere, thereby preventing stripping of the conductive polymer layer from the dielectric layer due to moisture absorption.

(3) Since conductive polymer portions filled in the pores and conductive polymer portions outside the pores (at the surface layer) are formed by the film-like polymer layer composed of the single component, the adhesion with the conductive polymer layers inside and outside the pores is high due to the anchoring action and thus the interface stripping due to heat stress, moisture absorption, or the like hardly occurs.

In addition, by forming on the first polymer layer 3A the second polymer layer 3B having the particle size greater than that of the first polymer layer 3A to provide the two-layer structure thereof, it is possible to suppress, in the first polymer layer 3A composed of the finer particles, degradation in conductivity of the polymer layer caused by the influence of particle boundary destruction due to heat stress or the like.

Therefore, it is possible to prevent the interface stripping and the degradation in conductivity of the conductive polymer layer otherwise caused by heat stress or moisture absorption, thereby achieving the low ESR and largely improving the reliability of the capacitor in both a high temperature atmosphere and a high humidity atmosphere.

The description will be continued hereinbelow using Specific Examples, but this invention is not limited thereto. In the following Specific Examples, a commercial polymer solution having a particle size distribution of 30 nm to 50 nm was used as a first polymer solution and a commercial polymer solution having a particle size distribution of 1 μm to 10 μm was used as a second polymer solution.

At first, a description will be given of Test Examples as the bases of the Specific Examples.

Test Example 1

In this Test Example, a description will be given from the start of element fabrication up to observation of the surface of a porous body and pore diameters thereof.

An element was fabricated by using, as an anode conductor, a porous aluminum foil of 3 mm×4 mm having been subjected to a surface-enlarging treatment by etching and repeating immersion thereof several times into a bath containing a monomer solution, a dopant, and an oxidizing agent solution to form a conductive polymer layer of poly-3,4-dioxythiophene in pores of the porous body by chemical polymerization.

As a result of observing pore diameters on the surface of this element by using a SEM (Scanning Electron Microscope), it was confirmed that a large number of pores of about 100 nm were scattered. Further, the external appearance of the polymer layer at the surface was a knotty irregular surface with cohering particles and was not in the form of a smooth film.

Test Example 2

In this Test Example, a description will be given from after the fabrication of Test Example 1 up to observation on filling of first and second polymer solutions into the pores of the porous body and film thickness observation.

A film-like continuous polymer layer was formed by dropping 5 μl of a poly-3,4-dioxythiophene solution with a particle size distribution of 30 nm to 50 nm (first polymer solution) on the surface of the element fabricated in Test Example 1, leaving it at ordinary temperature for 5 minutes, and then drying it at 150° C. for 30 minutes. This polymer layer is exemplarily illustrated in FIG. 1 as the first polymer layer denoted by symbol 3A.

A broken-out section of this element was observed using the SEM. As a result of observation from a surface layer of the porous body up to a depth of 5 μm, it was confirmed that space portions inside the pores were filled with the first polymer layer. Further, as a result of measuring the thickness of the surface layer by using a digital microgauge, it was 1 μm.

Likewise, a film-like continuous polymer layer was formed by dropping 5 μl of a poly-3,4-dioxythiophene solution with a particle size distribution of 1 μm to 10 μm (second polymer solution), leaving it at ordinary temperature for 5 minutes, and then drying it at 150° C. for 30 minutes. This polymer layer is exemplarily illustrated in FIG. 1 as the second polymer layer denoted by symbol 3B.

A broken-out section of this element was observed using the SEM. As a result of observation from a surface layer of the porous body up to a depth of 5 μm, it was confirmed that there was no filling of pore space portions with the second polymer layer. The thickness of this surface layer was 2 μm to 3 μm.

The surface layer of the first polymer solution was thinner than the surface layer of the second polymer solution by about 1 μm to 2 μm and thus it was confirmed also from the thickness values of the surface layers that the first polymer solution was penetrated into the pores.

Next, a description will be given of the Specific Examples obtained on the basis of the Test Examples described above.

Specific Example 1

Conductive polymer layers were formed by dropping 5 μl of a poly-3,4-dioxythiophene solution with a particle size distribution of 30 nm to 50 nm on the surface of an element fabricated in Test Example 1, leaving it at ordinary temperature for 5 minutes, then drying it at 85° C. for 1 minute, and thereafter, dropping thereon 5 μl of a poly-3,4-dioxythiophene solution with a particle size distribution of 1 μm to 10 μm, drying it at 125° C. for 10 minutes, and then drying it at 180° C. for 30 minutes. Then, a graphite layer and a silver conductive resin layer were formed thereon, thereby fabricating a capacitor element of this Specific Example. Three capacitor elements in total were fabricated in the same manner.

Table 1 shows ESR (100 kHz) values of the capacitor element after a 125° C. heat resistance test (no load) and a 65° C. moisture resistance test (no load), respectively. The test time is 1000 hours and the shown values are the average values of the three capacitor elements. This also applies to the following Specific Examples and Comparative Examples.

TABLE 1

| Polymer Layer Structure (A + B) Polymer Solutions (a) + (b) Dropping Amount (μl) | 100 kHz ESR (mΩ), n = 3pAVG. | | |
|---|---|---|---|
| | Initial | 125° C. Heat Resistance for 1000 hr (No Load) | 65° C. Moisture Resistance for 1000 hr (No Load) |
| Specific Example 1 | 5 + 5 | 6.2 | 8.6 | 12.8 |
| Specific Example 2 | 2.5 + 5 | 6.1 | 8.5 | 12.3 |
| Specific Example 3 | 10 + 5 | 6.9 | 8.9 | 13.1 |
| Specific Example 4 | 5 + 0 | 7.1 | 19.1 | 28.4 |
| Comparative Example 1 | 0 + 5 | 8.9 | 13.5 | 86.7 |
| Comparative Example 2 | 0 + 10 | 9.2 | 11.4 | 62.7 |

From Table 1, the initial ESR was 6.2 mΩ. The ESR after the 125° C. heat resistance test was 8.6 mΩ and the ESR after the 65° C. moisture resistance test was 12.8 mΩ.

Specific Example 2

A capacitor element was fabricated in the same manner as in Specific Example 1 except that the dropping amounts of poly-3,4-dioxythiophene solutions with a particle size distribution of 30 nm to 50 nm and with a particle size distribution of 1 μm to 10 μm were set to 2.5 μl and 5 μl, respectively, and a reliability evaluation was carried out in the same manner as in Specific Example 1.

From Table 1 the initial ESR was 6.1 mΩ. The ESR after the 125° C. heat resistance test was 8.5 mΩ and the ESR after the 65° C. moisture resistance test was 12.3 mΩ.

Specific Example 3

A capacitor element was fabricated in the same manner as in Specific Example 1 except that the dropping amounts of poly-3,4-dioxythiophene solutions with a particle size distribution of 30 nm to 50 nm and with a particle size distribution of 1 μm to 10 μm were set to 10 μl and 5 μl, respectively and a reliability evaluation was carried out in the same manner as in Specific Example 1.

From Table 1 the initial ESR was 6.9 mΩ. The ESR after the 125° C. heat resistance test was 8.9 mΩ and the ESR after the 65° C. moisture resistance test was 13.1 mΩ.

Specific Example 4

A capacitor element was fabricated in the same manner as in Specific Example 1 except that the dropping amounts of poly-3,4-dioxythiophene solutions with a particle size distribution of 30 nm to 50 nm and with a particle size distribution of 1 μm to 10 μm were set to 5 μl and 0 μl, respectively, i.e. only the first polymer layer was formed, and a reliability evaluation was carried out in the same manner as in Specific Example 1.

From Table 1, the initial ESR was 7.1 mΩ. The ESR after the 125° C. heat resistance test was 19.1 mΩ and the ESR after the 65° C. moisture resistance test was 28.4 mΩ.

Next, the Comparative Examples will be described with reference to FIG. 2.

Figure 2:
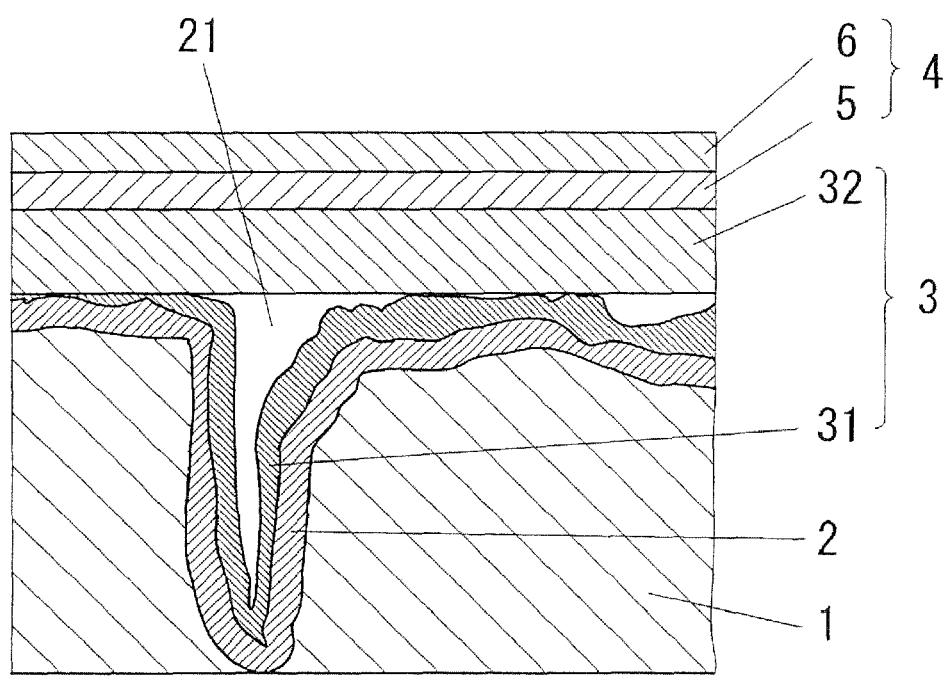
FIG. 2 is an exemplary sectional view illustrating a main portion of a solid electrolytic capacitor of Comparative Examples.

In FIG. 2, an inner polymer layer 31 covers a dielectric layer 2 even in pores of a porous body, but the pores are not closed at their openings (e.g. 21) and an outer polymer layer 32 covers the entire surface without entering the pores.

Comparative Example 1

A capacitor element was fabricated in the same manner as in Specific Example 1 except that a conductive polymer layer was formed by dropping 5 μl of a poly-3,4-dioxythiophene solution with a particle size distribution of 1 μm to 10 μm on the surface of an element fabricated in Test Example 1, drying it at 125° C. for 10 minutes, and then drying it at 180° C. for 30 minutes, and a reliability evaluation was carried out in the same manner as in Specific Example 1.

From Table 1, the initial ESR was 8.9 mΩ. The ESR after the 125° C. heat resistance test was 13.5 mΩ and the ESR after the 65° C. moisture resistance test was 86.7 mΩ.

Comparative Example 2

A capacitor element was fabricated in the same manner as in Comparative Example 1 except that the dropping amount of the poly-3,4-dioxythiophene solution was set to 10 μl, and a reliability evaluation was carried out in the same manner as in Specific Example 1.

From Table 1, the initial ESR was 9.2 mΩ. The ESR after the 125° C. heat resistance test was 11.4 mΩ and the ESR after the 65° C. moisture resistance test was 62.7 mΩ.

From Specific Examples 1 to 3, the ESR can be lowered and the reliability can be enhanced by using the first polymer solution and the second polymer solution to form the first polymer layer 3A and the second polymer layer 3B, respectively.

By comparison with Comparative Examples 1 and 2, it has been understood that the moisture resistance properties are largely improved in Specific Example 4 and thus the effect of filling the pores of the porous body with the solid electrolyte layer largely contributes thereto. That is, it has been understood that, for improving the reliability, it is essential to provide the film-like first polymer layer 3A that closes the openings of the pores on the surface of the porous body and further fills at least a portion of each of the pores and, further, that the heat resistance properties are also largely improved by providing the two-layer structure as in Specific Examples 1 to 3. In this two-layer structure, the first polymer layer 3A serves to fill the pores and, further, since the upper surface of the first polymer layer 3A becomes flat, it also serves to be an excellent underlayer for allowing the large-particle-size second polymer layer 3B to be delicately formed thereon.

Further, from Specific Examples 1 to 3, since the difference in reliability is small with respect to a change in amount of the first polymer layer 3A and the excellent properties are maintained, the possibility of reduction in thickness is indicated and thus a reduction in height of solid electrolytic capacitors can be expected.

From the above, it has been understood that, for improving the heat resistance properties in addition to the moisture resistance properties, it is best to provide the two-layer structure comprising the first polymer layer 3A and the second polymer layer 3B.

Generally, it is considered that the moisture resistance properties largely depend on the effect of filling the pores with the polymer layer, while, the heat resistance properties are improved simply as the particle size of the conductive polymer increases.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A solid electrolytic capacitor comprising:
   an anode conductor including a porous valve-acting metal and having pores with openings in a surface thereof;
   a solid electrolyte layer formed on the surface of the anode conductor so as to be filled in at least a portion of each of the pores and to close the openings; and
   a cathode conductor formed on the solid electrolyte layer;
   wherein the solid electrolyte layer comprises:
      an inner polymer layer spread along the surface of the anode conductor;
      a first polymer layer formed on the inner polymer layer; and
      a second polymer layer formed on the first polymer layer and having a particle size that is greater than a particle size of the first polymer layer;
   wherein the inner polymer layer and the first polymer layer cooperatively close the openings; and
   wherein the first polymer layer is formed by drying a first polymer solution which contains a conductive polymer having a particle size that is smaller than a diameter of each of the openings, and which is adhered to the inner polymer layer.

2. The solid electrolytic capacitor according to claim 1, wherein the anode conductor has a dielectric layer at the surface thereof and the solid electrolyte layer is formed on a surface of the dielectric layer.

3. A method of manufacturing a solid electrolytic capacitor, comprising:
preparing an anode conductor including a porous valve-acting metal and having pores with openings in a surface thereof; and
forming a solid electrolyte layer on the surface of the anode conductor so as to be filled in at least a portion of each of the pores and to close the openings;
wherein forming the solid electrolyte layer comprises:
  forming an inner polymer layer spread along the surface of the anode conductor;
  forming a first polymer layer on the inner polymer layer; and
  forming a second polymer layer on the first polymer layer, the second polymer layer having a particle size that is greater than a particle size of the first polymer layer;
wherein the inner polymer layer and the first polymer layer cooperatively close the openings; and
wherein forming the first polymer layer comprises:
  preparing a first polymer solution containing a conductive polymer having a particle size that is smaller than a diameter of each of the openings; and
  forming the first polymer layer by adhering the first polymer solution to the inner polymer layer and drying the adhered first polymer solution.

4. The method according to claim 3, wherein the particle size of the first polymer solution is 20% or less of the diameter of each of the openings.

5. The method according to claim 3, wherein $D_{90}$ is 100 nm or less in a particle size distribution of the first polymer solution.

6. The method according to claim 3, wherein the first polymer solution has a same type of polymer backbone as the inner polymer layer.

7. The method according to claim 3, wherein forming the second polymer layer comprises:
preparing a second polymer solution containing a conductive polymer having a particle size that is greater than the particle size of the first polymer solution; and
forming the second polymer layer by adhering the second polymer solution to the first polymer layer and drying the adhered second polymer solution.

8. The method according to claim 7, wherein the particle size of the first polymer solution is 20% or less of the diameter of each of the openings.

9. The method according to claim 7, wherein $D_{90}$ is 100 nm or less in a particle size distribution of the first polymer solution.

10. The method according to claim 7, wherein the first polymer solution has a same type of polymer backbone as the inner polymer layer.

11. The method according to claim 7, wherein $D_{10}$ is 1 µm or more in a particle size distribution of the second polymer solution.

12. The method according to claim 7, wherein the second polymer solution has a same type of polymer backbone as the first polymer solution.

13. The method according to claim 7, wherein the conductive polymer of each of the first and second polymer solutions contains at least one monomer selected from pyrrole, thiophene, 3,4-ethylene dioxythiophene, and derivatives thereof.

14. The method according to claim 3, wherein the valve-acting metal is at least one of aluminum, tantalum, and niobium.

15. The method according to claim 3, further comprising forming a cathode conductor on the solid electrolyte layer.

* * * * *